United States Patent [19]
Gray

[11] 3,897,298
[45] July 29, 1975

[54] APPARATUS FOR MAKING FOAM BUILDINGS

[76] Inventor: Robert Gray, The Old House, The Square, Yarmouth, Isle of Wight, England

[22] Filed: Mar. 5, 1973

[21] Appl. No.: 338,288

[52] U.S. Cl. .................... 156/500; 425/60; 425/63; 425/89
[51] Int. Cl. .............................................. B28b 1/32
[58] Field of Search ......... 156/71, 78, 79, 244, 245, 156/391, 425, 500; 264/45, 47, 299, 208, 310, 328; 249/1, 13, 82, 207, 209, 212; 52/64, 65, 69, 80, 408, 414, 747, 749; 425/4, 60, 63, 89, 130, 131, 375, 460, 289

[56] References Cited
UNITED STATES PATENTS

| | | | |
|---|---|---|---|
| 1,995,692 | 3/1935 | Urschel | 425/60 |
| 3,365,855 | 1/1968 | Vermette | 52/80 |
| 3,443,276 | 5/1969 | Smith et al. | 425/60 |
| 3,616,070 | 10/1971 | Lemelson | 156/500 |
| 3,767,336 | 10/1973 | Casey | 425/60 |
| 3,776,990 | 12/1974 | Watkins et al. | 425/63 |

*Primary Examiner*—Caleb Weston
*Attorney, Agent, or Firm*—Wolfe, Hubbard, Leydig, Voit & Osann, Ltd.

[57] ABSTRACT

The present invention relates to a method and apparatus for constructing a building. A movable nozzle defines the thickness of a wall of the building, and foaming reactants are passed through the foam as the nozzle is moved at a controlled speed along a path defining a contour of the building at a speed such that foam is stable as it exits from the nozzle to form the wall of the building.

12 Claims, 48 Drawing Figures

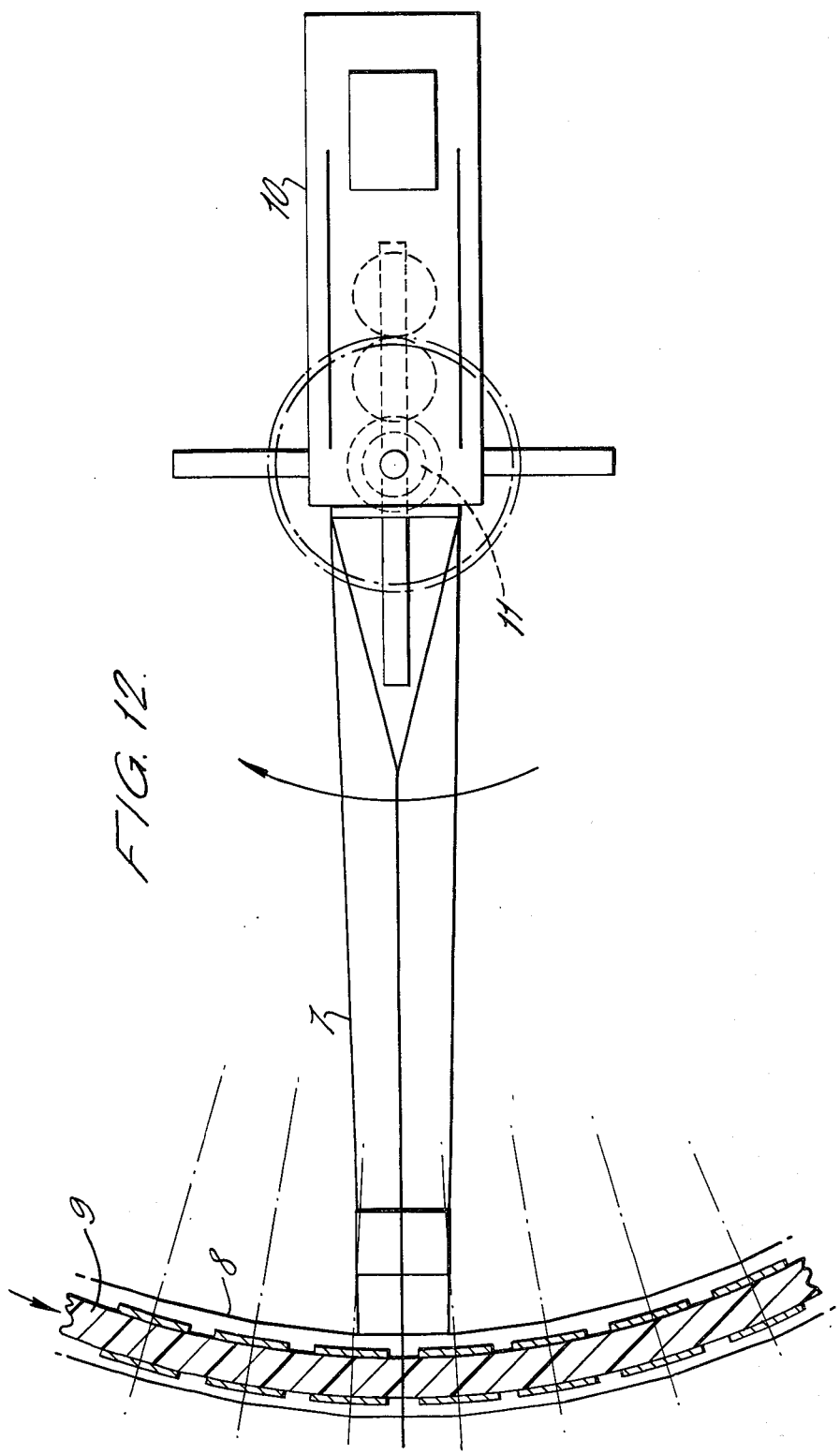

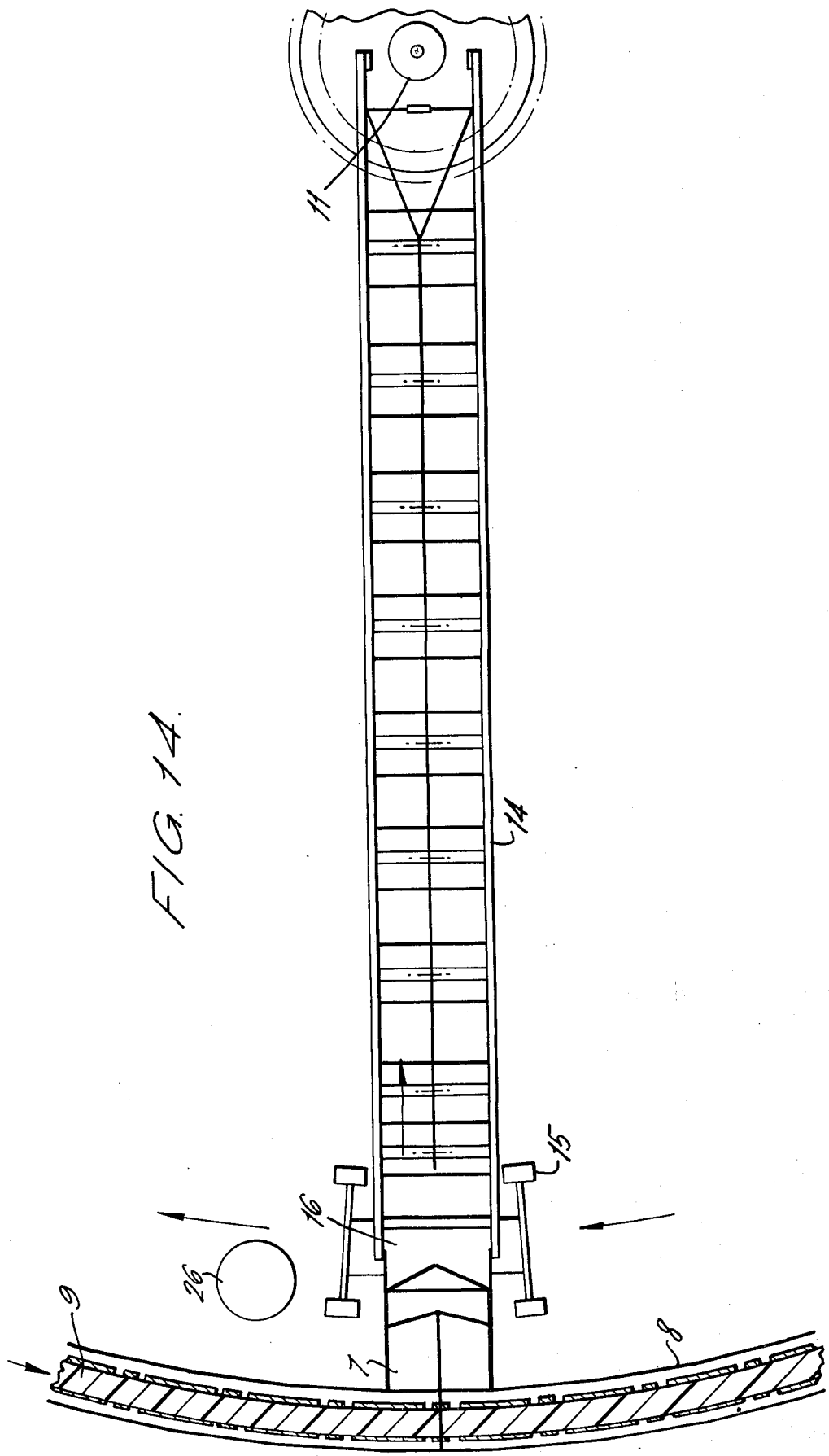

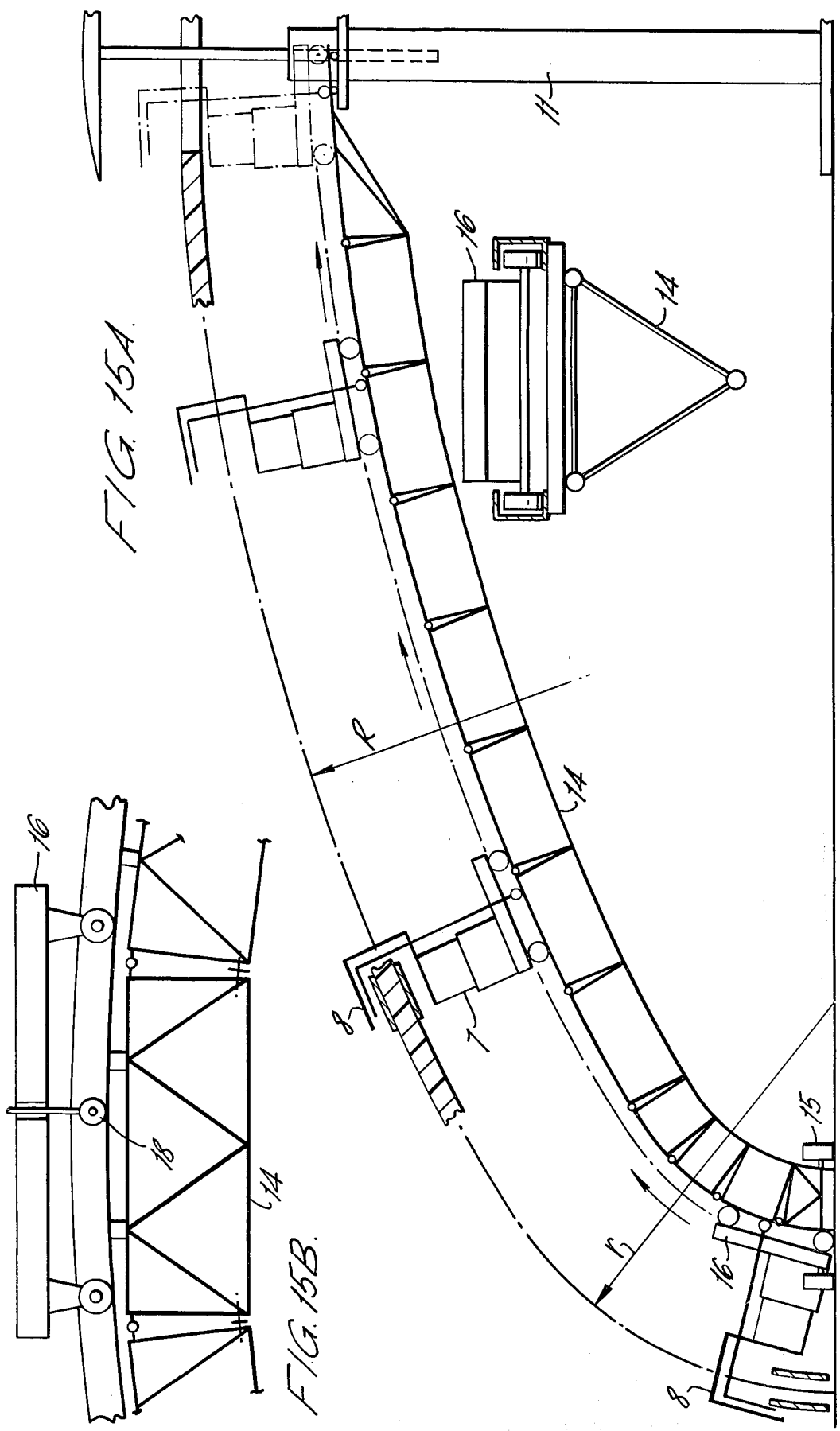

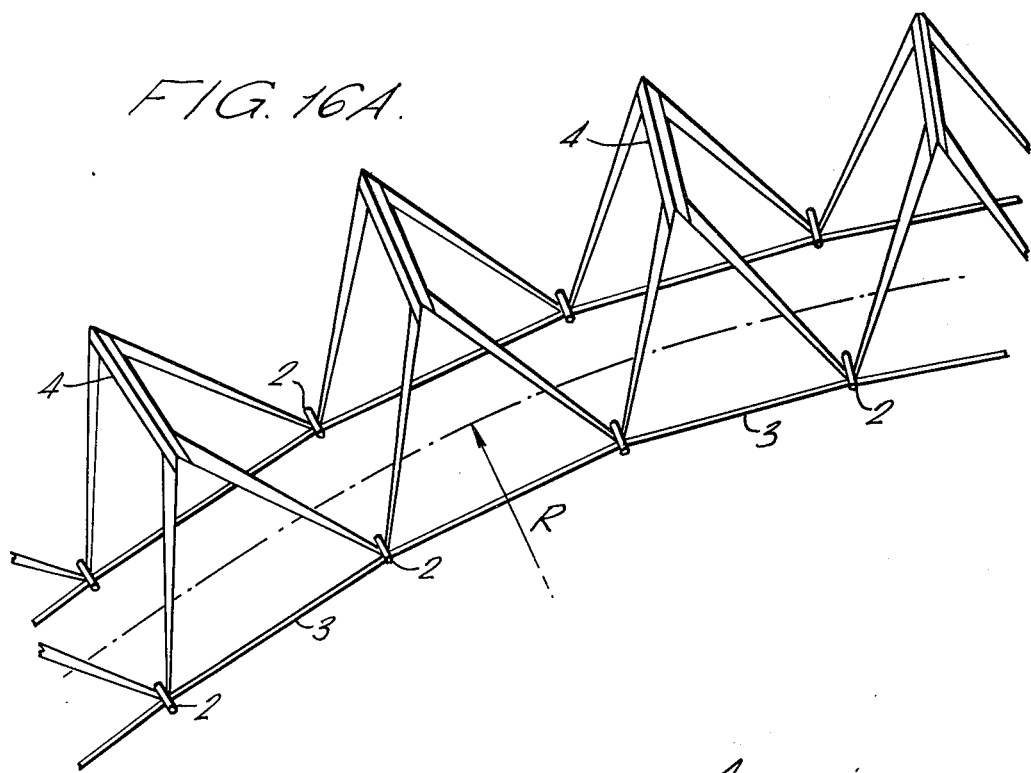
FIG. 16A.
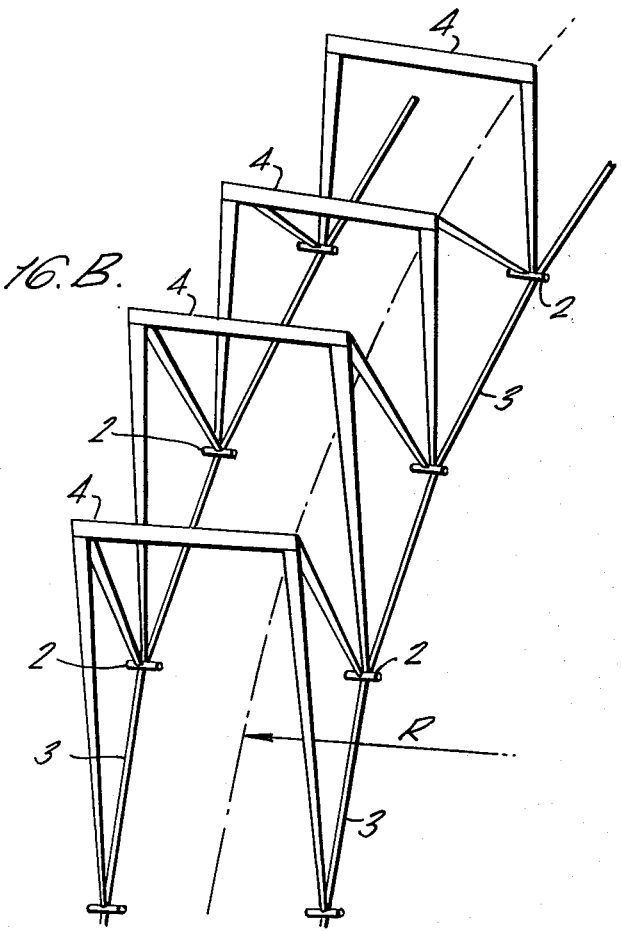
FIG. 16.B.

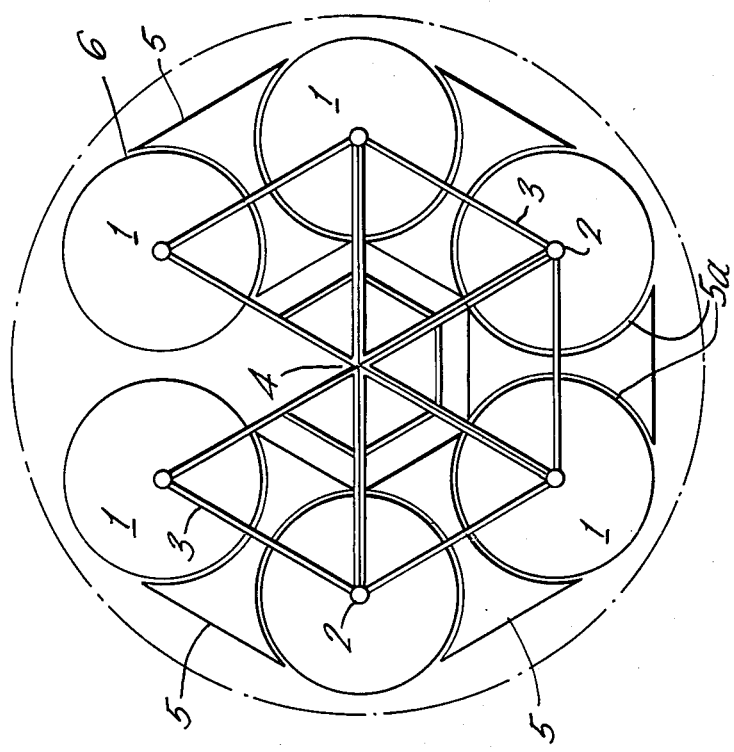
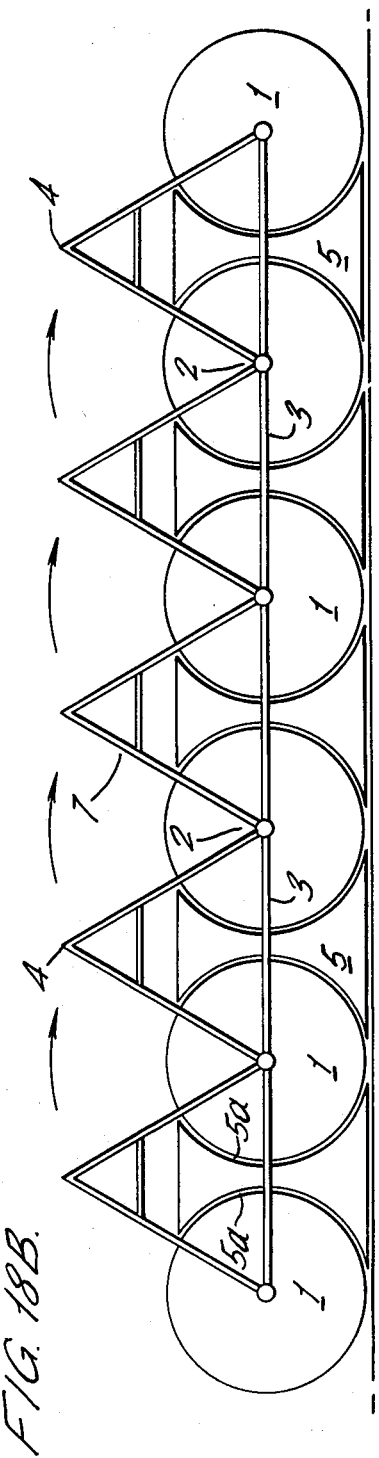
FIG. 18A.
FIG. 18B.

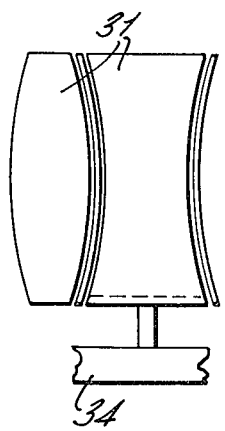
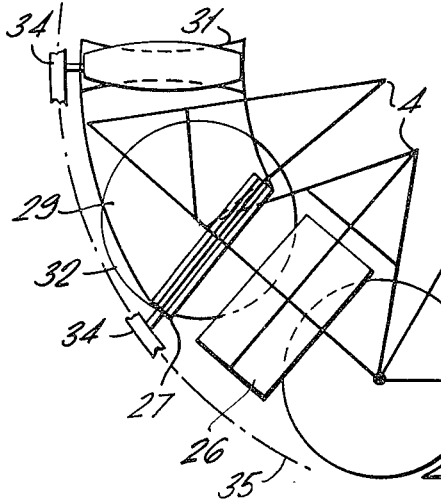
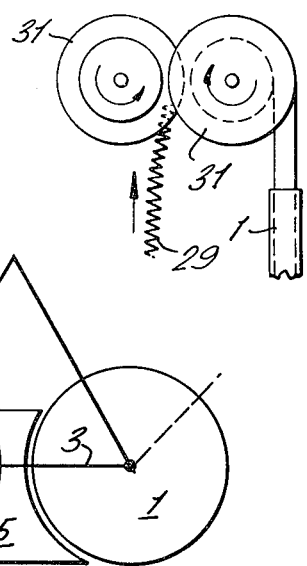
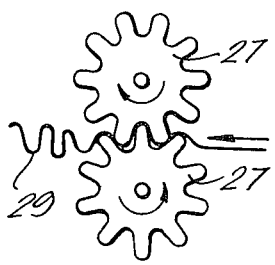
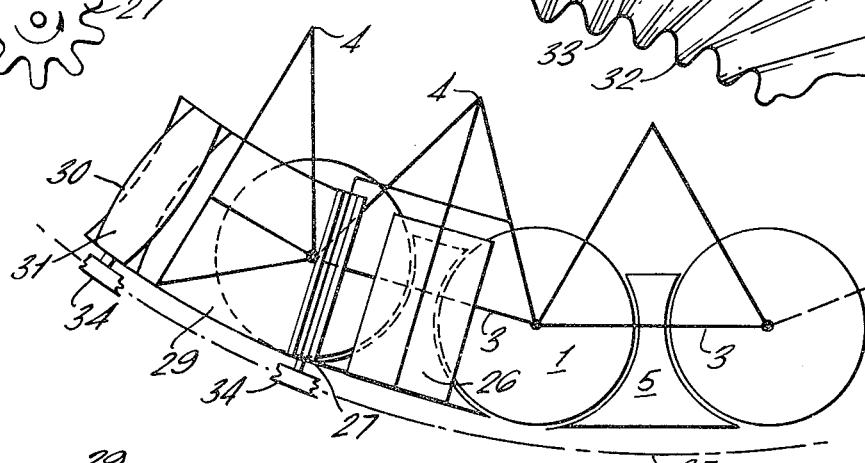

APPARATUS FOR MAKING FOAM BUILDINGS

DESCRIPTION OF THE INVENTION

The invention relates to a method and apparatus of constructing a building, and to buildings constructed by the method.

Buildings are often required to be erected quickly and inexpensively by using a minimum of labour. Traditional methods of construction, however, have the disadvantage that materials used are often bulky and difficult to transport to a building site.

It is accordingly an object of the invention to provide an inexpensive method of constructing a building in situ.

It is yet another object of the invention to provide a method of constructing a building, comprising the steps of providing a movable nozzle defining the thickness of a wall of the building, passing foaming reactants through the nozzle, and moving the nozzle at a controlled speed along a path defining a contour of the building at a speed such that the foam is stable as it exits from the nozzle to form the wall of the building.

According to a further object the mobile nozzle may rotate continuously from a position substantially at right angles to a vertical axis of the building to be constructed to a position lying substantially along the vertical axis so that a series of concentric circles of foam are progressively formed one upon the other in a vertical direction each one having a diameter less than an immediately preceding one, the series of circles defining a building which is of substantially hemispherical shape.

The layers may be superimposed so that a succeeding layer overlaps an immediately preceding layer.

According to another advantageous feature, the method may preferably include the step of passing foil through the nozzle adjacent at least one wall so that the foam leaving the nozzle has a covering of foil on at least one surface.

According to yet another object, the invention provides apparatus for constructing a building comprising a movable nozzle, means for moving the nozzles at a controlled speed and means for passing foam forming reactants into the nozzle, so that when the reactants are passed into the nozzle and the nozzle is moved at the controlled speed, a stable foam forming a wall of the building is produced.

There may be two or more nozzles.

In a further object of the invention there may be provided a pair of inwardly facing shutters, set substantially parallel to each other and defining the thickness of the wall of the building. The pair of shutters can be rotated with the nozzle in a horizontal plane about a fixed point, and can also be elevated about a radius arm from the horizontal position to the vertical axis of the building, which lies on the centre of rotation. The nozzle is suitably secured to the leading edge of the pair of shutters, which nozzle deposits a stream of foamable reactants in the path of the circumferentially moving shutters. The shutters may travel along a circular path swept by the radius arm, defining the contour of the building, at such a speed that the expanding foam is contained between the pair of shutters until it becomes stable and emerges from the trailing end of the shutters to form part of the wall of the building.

In a preferred embodiment, the pair of shutters and the nozzle may rotate continuously and circumferentially from a position substantially at right angles to the vertical axis of the building to be constructed to a position lying substantially along the vertical axis, so that a series of wall sections formed from stable foam are progressively formed one upon another in a vertical direction, each section being progressively inclined inwards, the series of wall sections defining a building which is substantially hemispherical in shape.

The shutters and nozzle may describe substantially circular paths in the horizontal plane that decrease in radius about the vertical axis of the building and in that the radius of curvature of the shutter faces may be altered in a vertical plane, so that the completed wall sections form an ellipsoidal dome.

The two shutters may be capable of flexing about the line of travel. The shutters may also be guided to form a predetermined reflexing path that crosses and recrosses the average centreline of the wall of the building. The stable foam emerges from the reflexing shutters in a series of corrugations. The corrugations extend radially out from the completed building's apex, and may increase in amplitude and wavelength to a maximum at the circumference at ground level.

The liquid foam may be prevented from adhering to the internal surfaces of the shutters, as it expands and becomes stable. Flat sheet material, such as aluminium foil, may be carried one to each shutter, so that the sheet can be payed out and may cover the internal surface of its respective shutter. As the shutters travel about their orbit the foil sheets may slide over the shutter face and become rigidly attached to the stable foam, and may cover both faces of the wall of the building. Due to the shutters being shaped in the form of a spherical zone, the flat foil sheets may be given double curvature to conform to the internal shutter surfaces. In this way the flat sheets will become locally extendable, and will conform to the double curvature of the shutters. Should the double curvature be varied in the process of forming the building, the foil sheets will follow this change to the limit of the crimping extension.

The floor area of one dome is suitable limited by the size and capacity of the equipment. The total covered floor area may be extended by casting similar domes immediately adjacent and symmetrical to the original dome, and interconnecting these domes by joining their respective portals. To increase the ratio of covered floor area to total overall area, the domes may be cast so that their circumferences overlap. The intersection of adjacent overlapping domes can be supported on suitable semicircular or elliptical arches. In this way one dome can be supported on four similar arches, set in the form of a square, which in turn support one quarter of the adjacent dome to each of these arches.

Further objects and advantages of the invention will become apparent from reference to the following description which should be read in conjunction with the drawings and wherein:

FIGS. 12 and 13 show the plan and elevation of the equipment necessary to construct a hemi-spherical dome;

FIGS. 14 and 15A and 15B show the plan and elevation of the equipment necessary to build an ellipsoidal dome;

FIGS. 16A and 16B and 17A and 17B and 18A and 18B show details of the construction of articulating shutters;

FIGS. 23A to 23F show the method of handling the shutter lining material.

Figure 1:
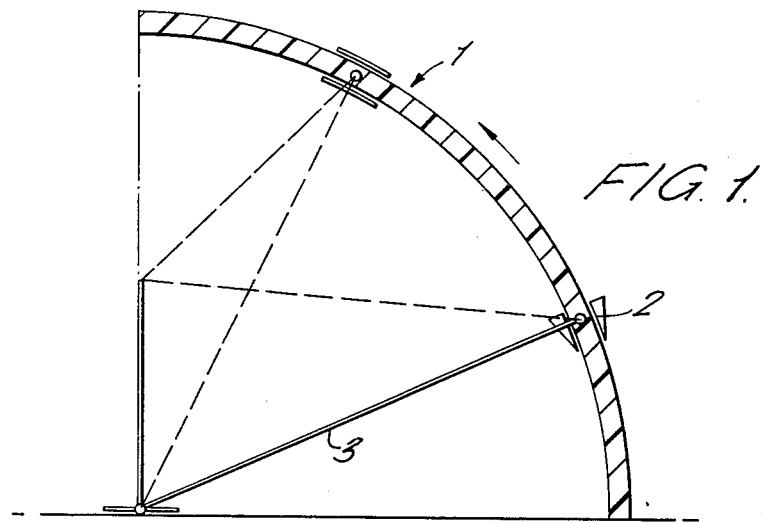
FIG. 1 shows a vertical section through apparatus used in a method for forming a hemispherical building from foamed polystyrene.
Figure 2:
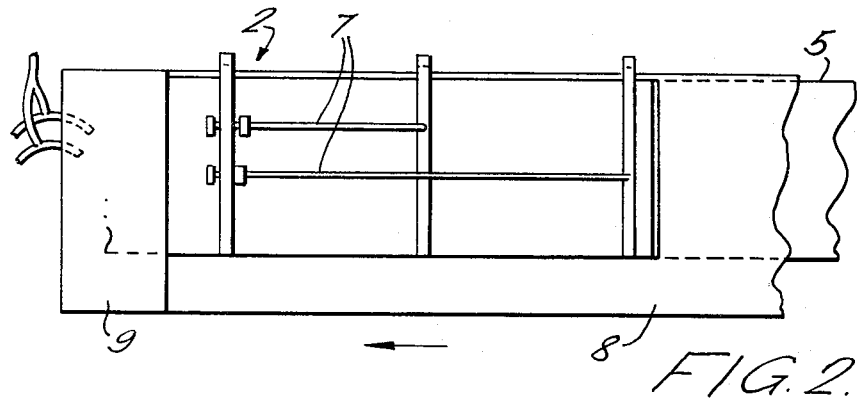
FIG. 2 shows an elevation of part of the apparatus.
Figure 3:
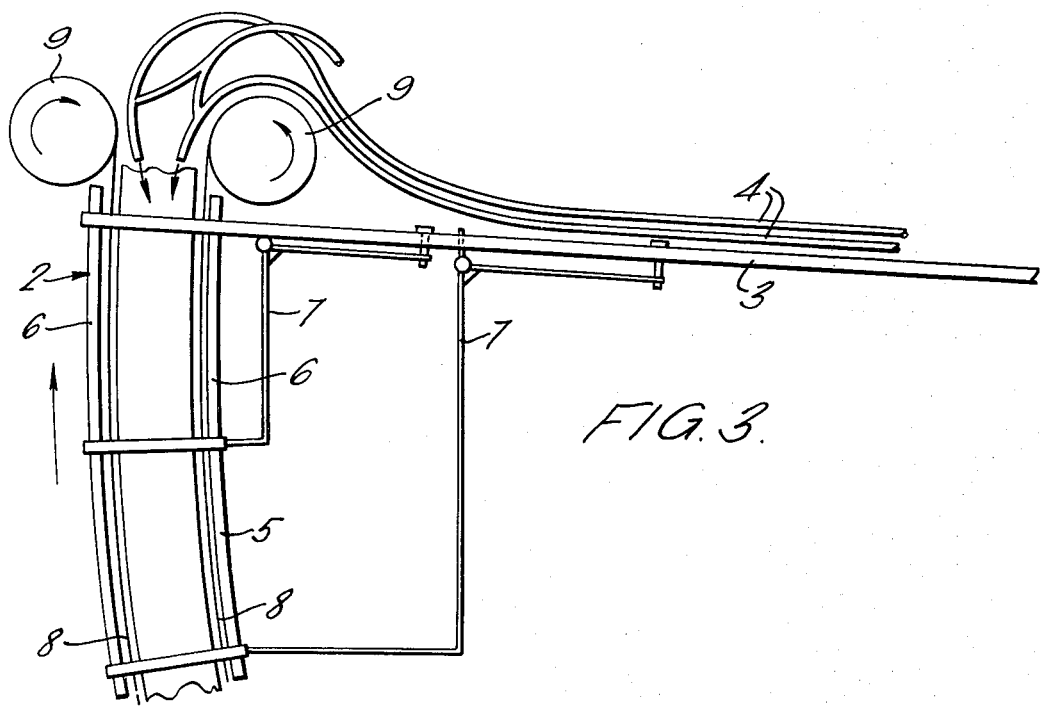
FIG. 3 shows a plan view of the part of the apparatus shown in FIG. 2.
Figure 4:
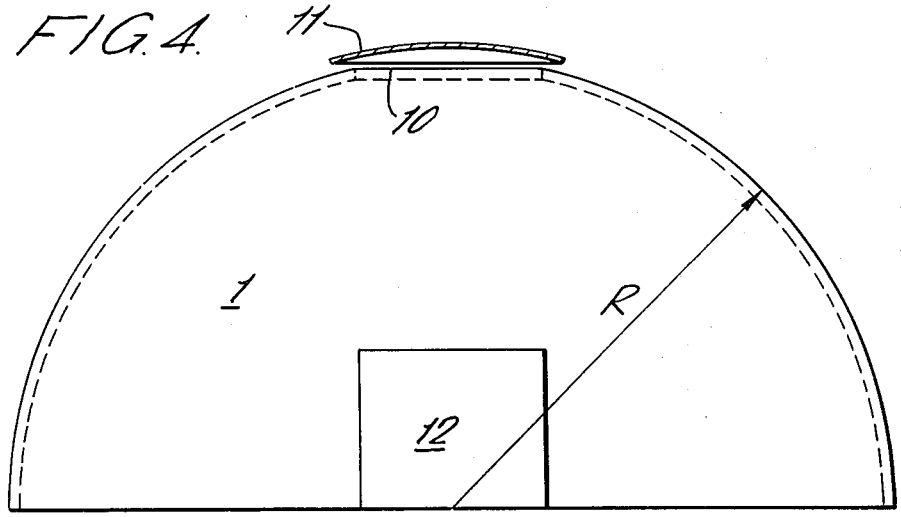
FIGS. 4 and 5 show an elevational and plan view respectively of a hemispherical building, constructed using the apparatus of FIGS. 1 to 3.
Figure 5:
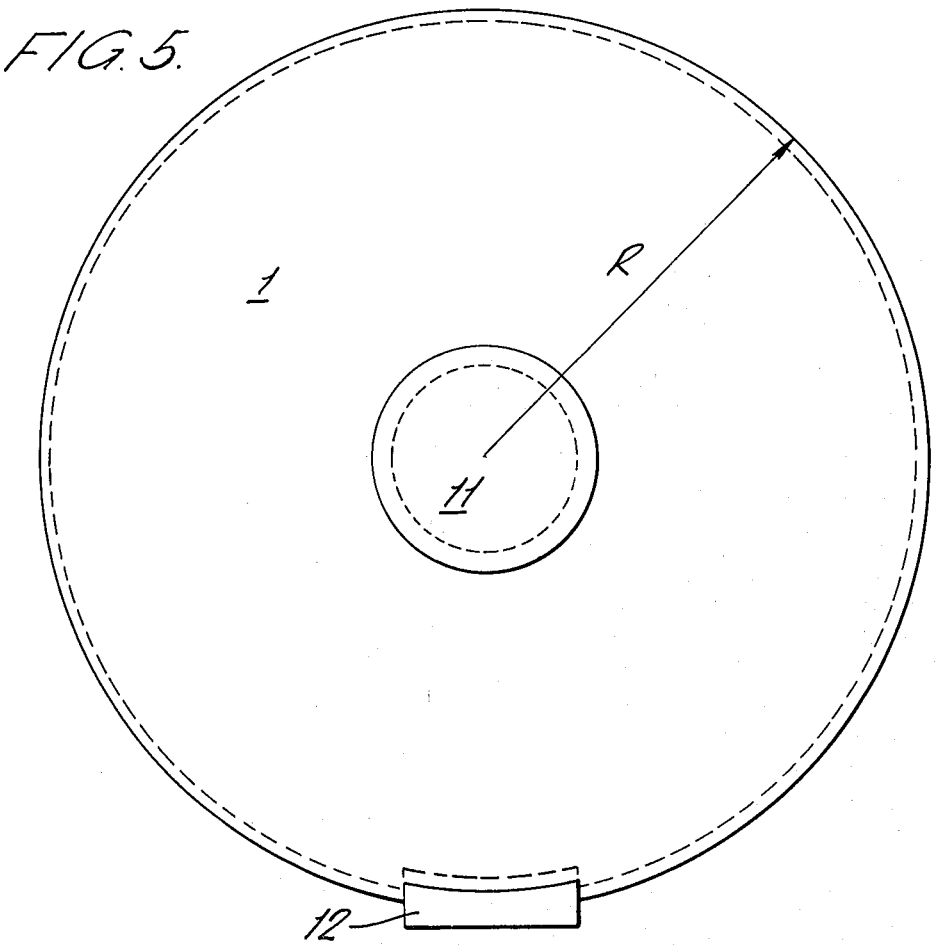

Referring to the drawings a building 1 is made in the form of a hemispherical dome, by directing foam from a nozzle 2 at the lateral extremity of a rotating arm 3. The arm 3 is extendable and is supported on a central mast, on a rotatable base by a tie bar. The arm 3 is supported at the centre of the dome, and is free to rotate about the vertical axis of the dome on the central mast, and also to incline relative to the centre axis as shown in dashed lines. Both the rotation and elevation would be controlled by a single operator in the centre of the dome.

Polystyrene foam is made from two liquids (a and b), supplied down hoses 4 which on mixing together in equal proportions, produce a foam. This foam sets solid to produce a lightweight material. The foaming and setting time is directly effected by high temperature, and can be cut down to about 30 to 60 seconds. In very warm conditions, 1 lb of liquid mixture will make about 3 cu. ft. of foam.

The foam is laid out in a continuous stream behind the nozzle as it rotates by a supply of compressed air. The method comprises either laying course by course, and lifting the nozzle after each complete revolution forming one course, or the first course could be inclined in a spiral and the rotating and increasing inclination of the nozzle could be continuous.

The liquid foam as it leaves the nozzle is contained in a mould 5 while it hardens. This is done by fixing an external and internal shutter behind the nozzle so that the whole unit travels round the wall as it is formed, the speed of travel being adjusted so that the foam is stable as it exits from the mould, which comprises part of the nozzle. The mould 5 comprises shutters 6, the curvature of which is adjustable by arms 7.

As the liquid foam sticks firmly to any grease-free surface, the travelling shutters are lined with a film of material that remains in contact with the foam as it expands and hardens. Aluminium foil 8 on rolls 9 is passed between the moving form and the foam, and payed out as the forms moved on, leaving both internal and external wall surfaces covered by foil.

The foil overlaps as it is payed out over the previous course, and acts as a weather-proof membrane and increases the heat insulation properties of the foam. A fire retardant may be added to the foam-forming reactants during mixing.

The wall may suitably be raised by 50 mm per revolution of the nozzle.

As the walls increase in height, they incline further inwards while maintaining the dome shape, and the rotating arm approaches the vertical. The radius of the travelling shutters remains unchanged during this process but the plan diameter of the unfinished dome decreases rapidly. At this point, further pouring must stop, as the shutters and the head are withdrawn from a small opening 10 at the apex of the dome at the end of moulding.

The residual opening at the apex may be covered by a perspex cover 11, in the form of a spherical sector of the same radius as the dome. If the sector is mounted clear of the dome's external surface to provide an annular exit, it will act as a ventilator as well as giving internal daylighting.

The main doorway 12 to the building is formed in the walls as they were built, and the former is stripped to allow the foam forming apparatus to be removed from the centre of the completed dome. Small window openings are cut of the completed building by means of a small hand saw.

It will be understood that if the foam arm remains at ground level in a horizontal position, the radius on plan of the top edge of the foil sheet is equal to the radius of the bottom edge of the foil sheet. As the wall is built upwards, it also curves inwards, and the difference between the two radii in plan of the foil edges increases. At the top of the dome, where the plastic cover is situated, the walls are virtually horizontal, hence the difference in plan radii of the two sheet edges approximates the full width of the sheet, on plan.

Due to the change from orbital movement to radial movement, the foam as it is being cast between the moving shutters must follow a curved path, and the curvature of this path increases with the inwards slope of the dome.

Accordingly, the foil sheets have a means of being crimped across the full width before they are payed out between the shutters. The extension of the crimped foil will gradually increase at the bottom face of the sheet, as the shutters are gradually articulated as they move upwards towards the apex. This crimping will maintain the radial cirvature of the foil on plan, as it passes through the shutters, and the foil surface will follow the curved path of the foam through the shutters.

The crimped edges of the formed foil are a maximum at the top or leading edges, and will be covered mostly by the next pass of foil, and will not be seen.

A spindle of the two foil rolls is capable of inclination in relation to the twin shutters, so that the foil is led off the rolls in a radial path between the shutters.

FIGS. 16, 17, 18 and 19 show the details of the articulating shutters, which are utilised in their basic form for both hemispherical and elliptical dome construction. The two shutters have to be of sufficient depth to retain the vertical rise of the expanding liquid foam contained therein. The length of the shutters is dependant on the rate of depositing the wet foam mixture within the shutter as it moves along its length so that the emerging exposed foam has fully expanded and has become stable.

Due to the double curvature of the shutters, which is necessary to form either hemispherical or ellipsoidal domes, the shutter face is made up from a series of spherical segments of the same radius as that of the completed dome. The segments 1 are positioned in pairs, on either side of the wall, the internal segment 1a having a convex face and the external segment 1b having a concave face. All the segments are centrally supported at the apex on the back face of each segment.

All the external segments 1b are linked together to form a chain, with the hinges 2 between the links acting as supports to the point of attachment of the segments. The internal segments 1a are likewise joined together. These links 3 are in the form of a triangle, with the external link, so that the axes of the hinges at each end of each pair of links lie on a common line that radiates inwards and passes through the centre of the dome. The apex of each pair of triangles 3 is cross connected by a radial beam 4 so that the shutter width is maintained, between faces.

Make up pieces 5 are inserted between the adjacent spherical segments and are formed from segments of the same radius, being physically joined by a sliding joint 5a that is capable of rotation round the periphery of each adjacent segment. The make up pieces 5 are supported from the mid-point of the base of each triangular link 3.

Figure 20A:
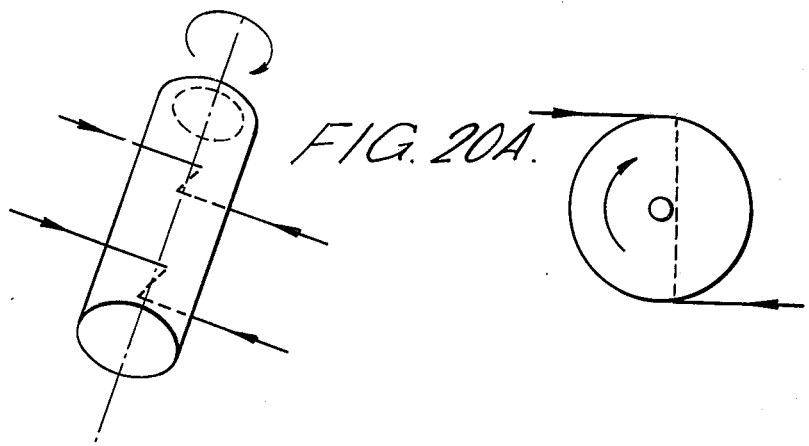
FIGS. 20A to 20C show the method of altering the articulation of the shutters.
Figure 20B:
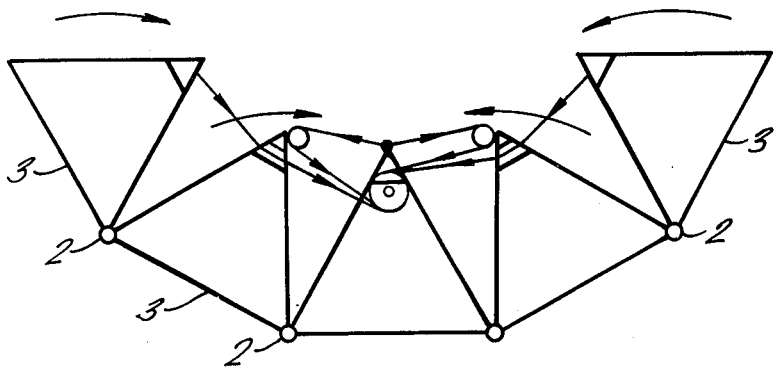
Figure 20C:
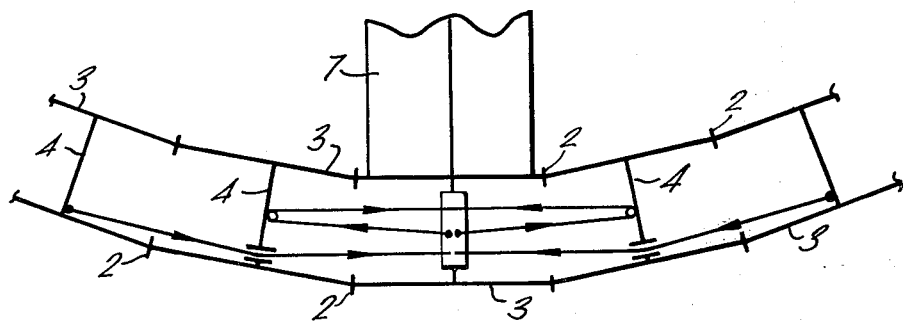

The radial path of the shutter describes a spherical zone, that gradually decreases as the apex of the dome is reached. This change of curvature is compensated by articulating the shutters, so that the lateral movement is maintained along the length of the shutters. By rotating each pair of triangular links about the hinges at the end of the triangle base causes the distance between each adjacent apices to alter. By this movement the shutters can be made to articulate, so that the movement of the shutter remains horizontal and remains within the spherical zone on rotation. The operational method of causing this articulation is shown on FIG. 20.

At the completion of the foaming operation, the shutters will have almost reached the apex of the dome, and will have articulated into a small circular path about the apex. At this point further foaming is stopped, and the shutters are further articulated, so that the apexes of all the triangular links form the centre point of a circular structure 6. By shortening part of the locating radius arm or jib 7, the whole shutter structure can be withdrawn down through the hole left at the apex of the dome, and the jib can now be lowered to the horizontal position complete with the shutter structure to the horizontal position.

Figure 6A:
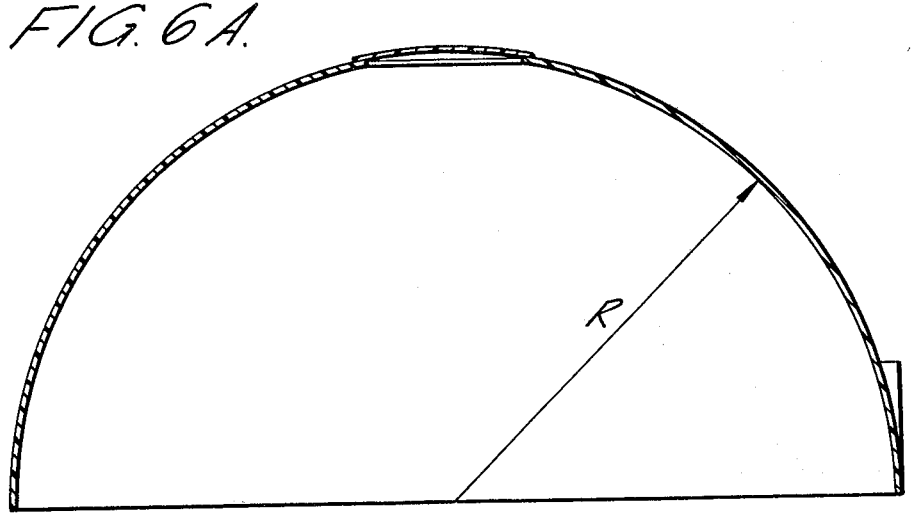
FIGS. 6A and 6B show the plan and section of a hemispherical dome.
Figure 6B:
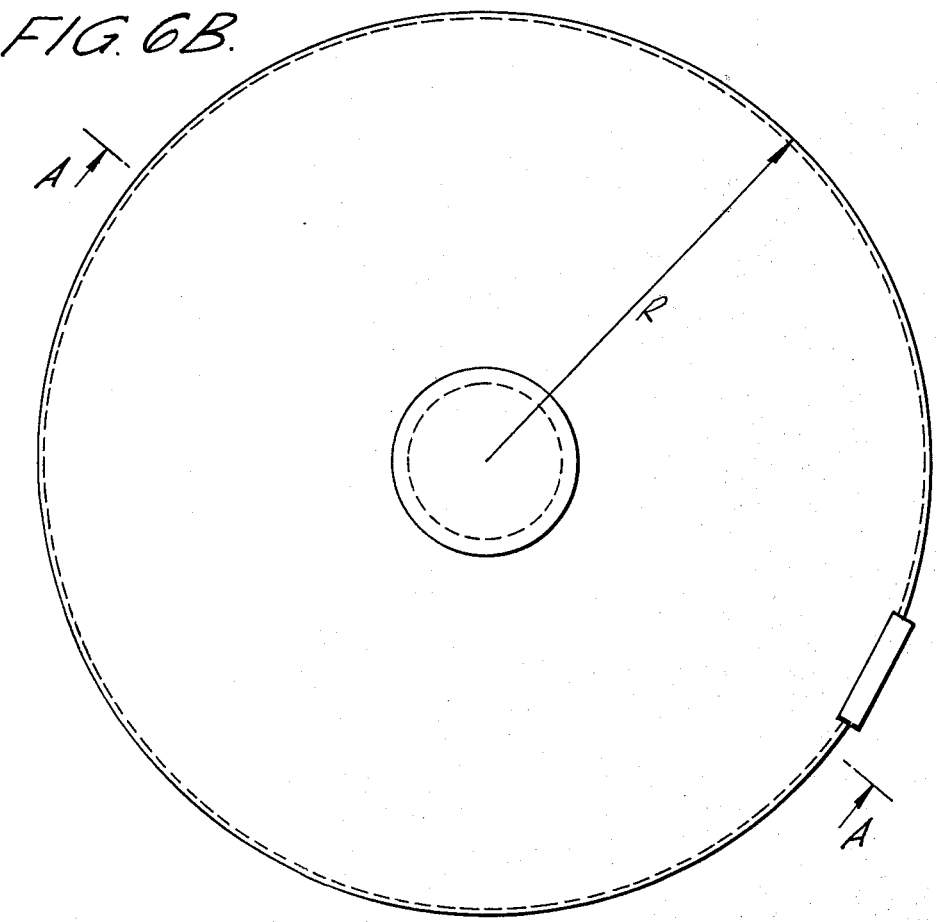
Figure 13:
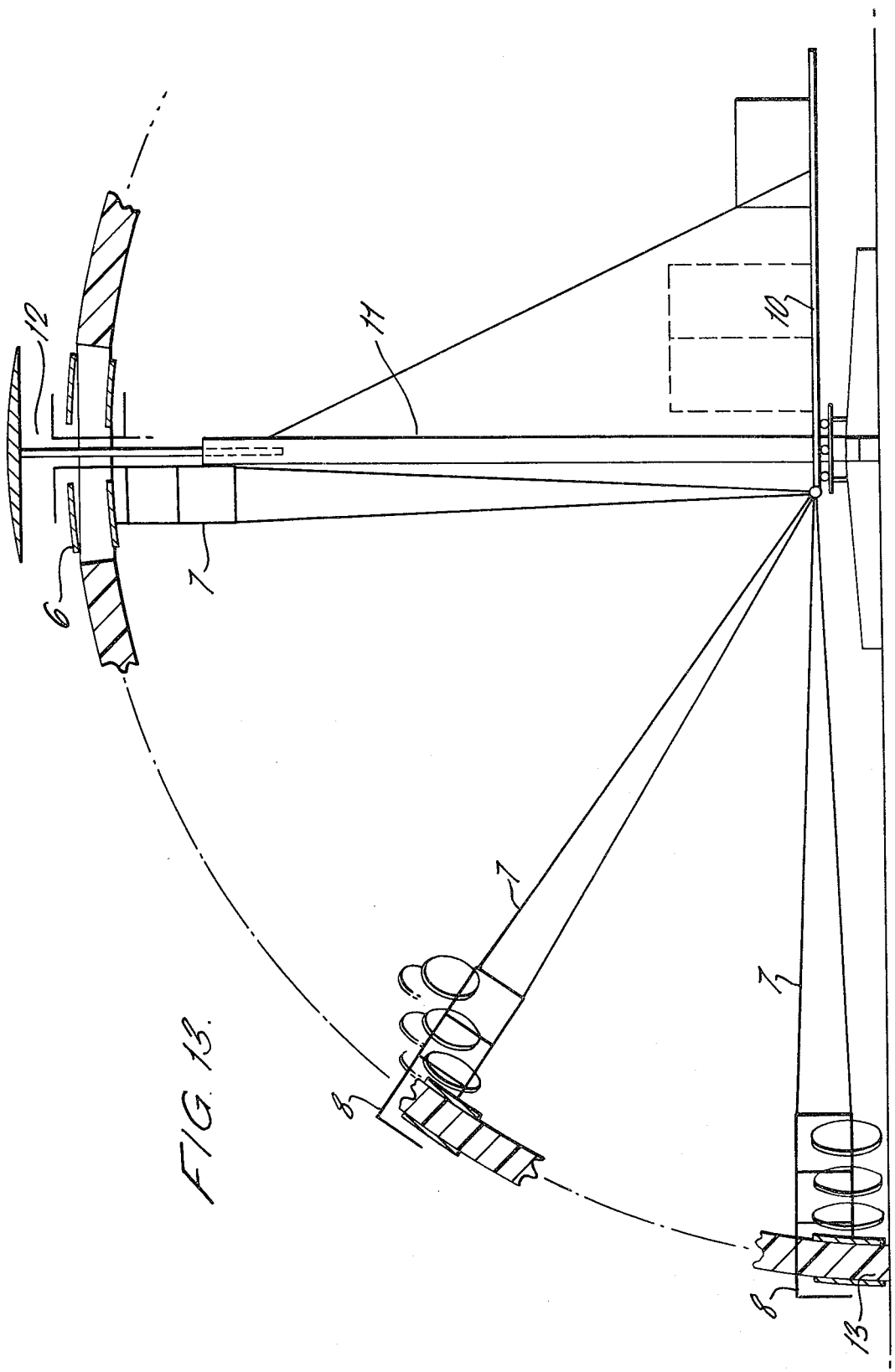
Figure 17A:
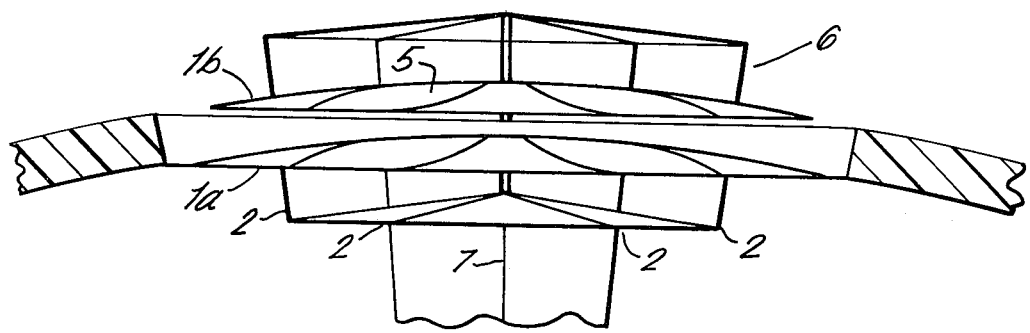
Figure 17B:
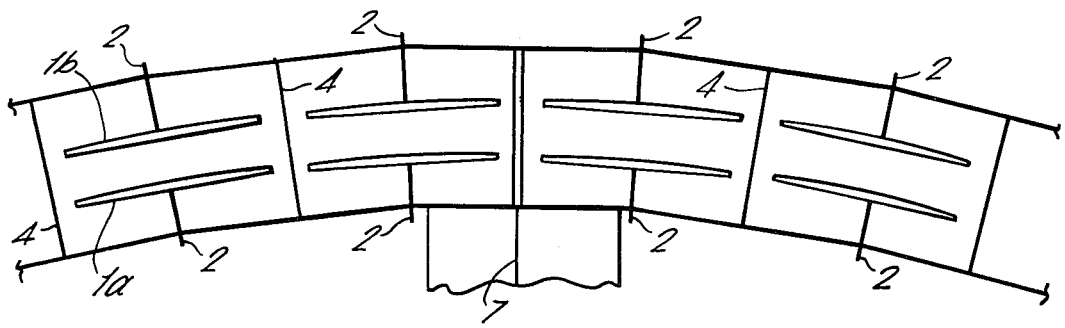
Figure 22B:
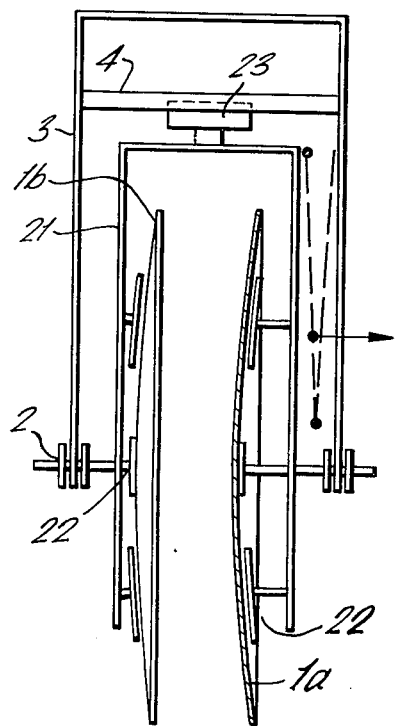
FIGS. 22A to 22D show the arrangement by which the shutters can be flexed to produce corrugated or fluted domes.
Figure 22D:
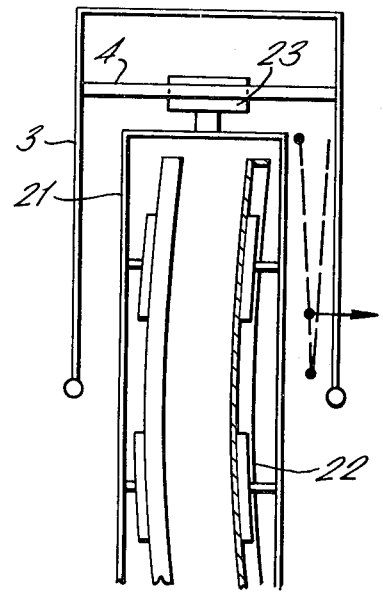
Figure 19A:
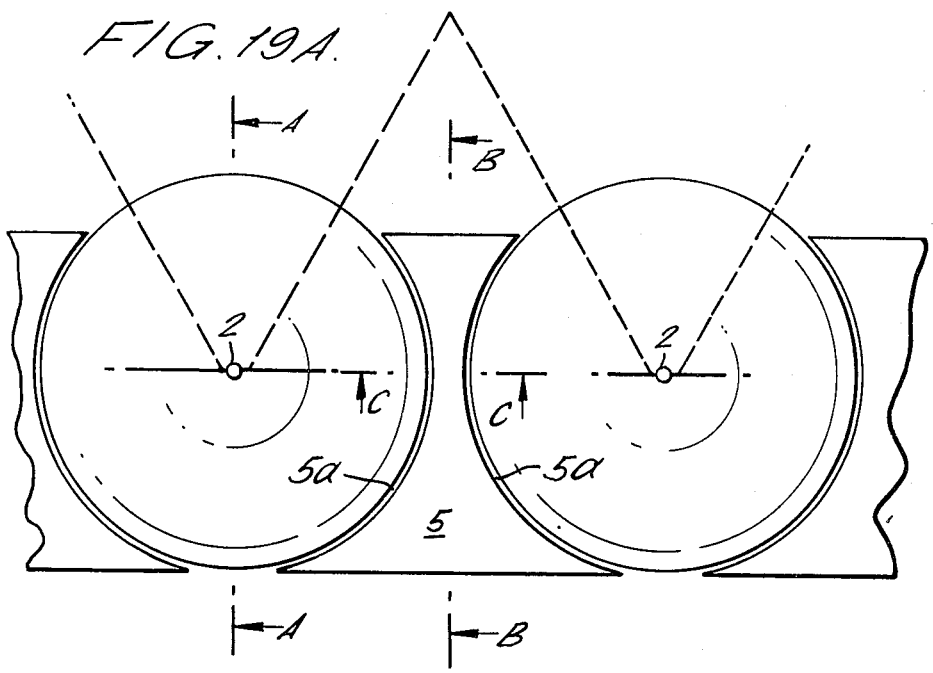
FIGS. 19A to 19C show constructional details of the shutter surfaces.
Figure 19B:
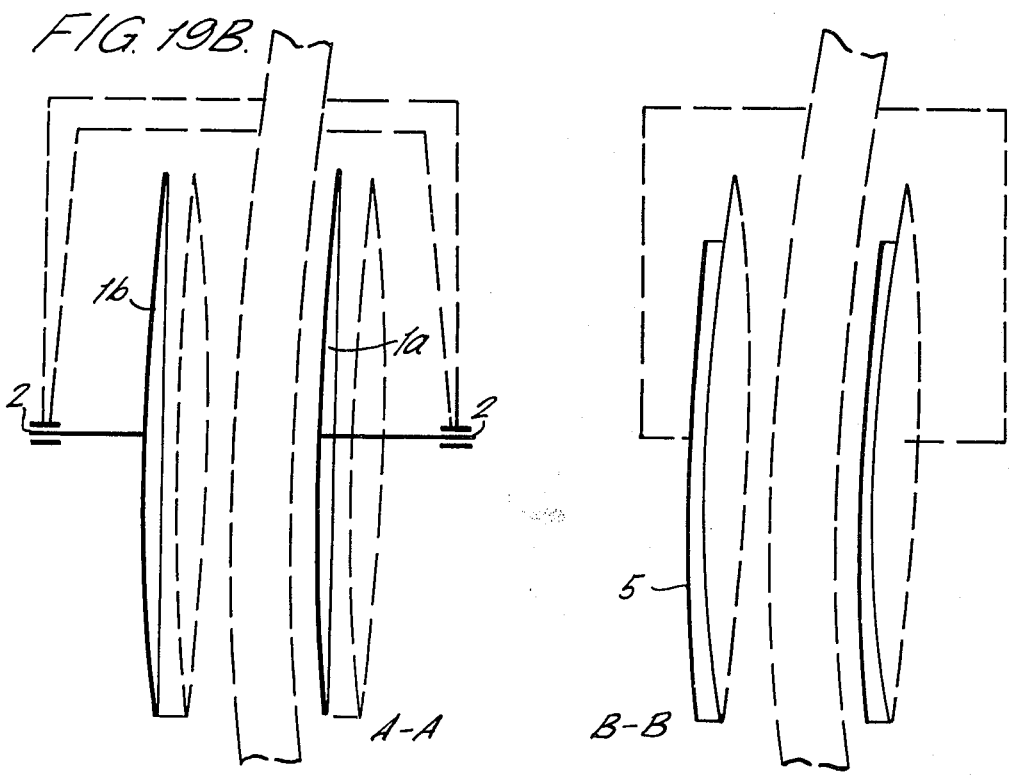
Figure 19C:
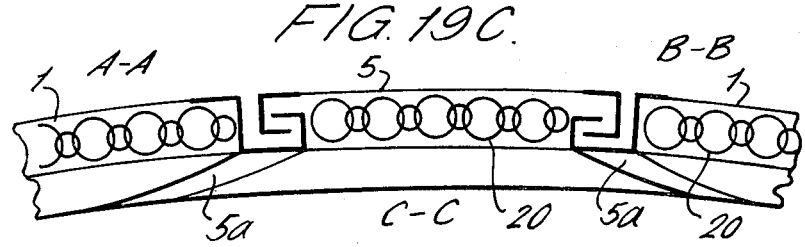

Referring to FIGS. 6, 12 and 13, the shutters 8 and the foam nozzle 9 are located at the free end of a telescopic radius arm 7, or jib. The jib is located by and hinged onto a platform 10, that is rotatable about a central mast 11.

The central mast supports a transparent plastic spherical cap or segment centrally above the apex on a retractable mast extension 12. At the start of construction, the shutters are located at ground level, with the locating radius arm in the horizontal plane. As the radius arm is moved slowly about the vertical mast, a steady stream of liquid foam is deposited ahead of the shutters by the foam nozzle 9. The shutters slide past the wet and expanding foam, and contain it until it becomes stable and can be left unsupported in the form of a wall 13. The wall of the dome is built up to the height of the shutter in one rotation, and by elevating the shutter by the radius arm 7, a second course can be started. Alternatively by graduating the rate of foam flow during formation of the first course, the wall can be built in a slow continuous spiral, which terminates at the apex.

During these movements, the shutter will have to be slightly articulated. On completion, the shutters are fully retracted 6, and the radius arm 7 is shortened, so that the external shutter passes within the dome. At this point, the jib and retracted shutter can be lowerd to the horizontal position. The hole left at the apex of the dome, can now be closed by the plastics dome by lowering the central mast extension.

Figure 7A:
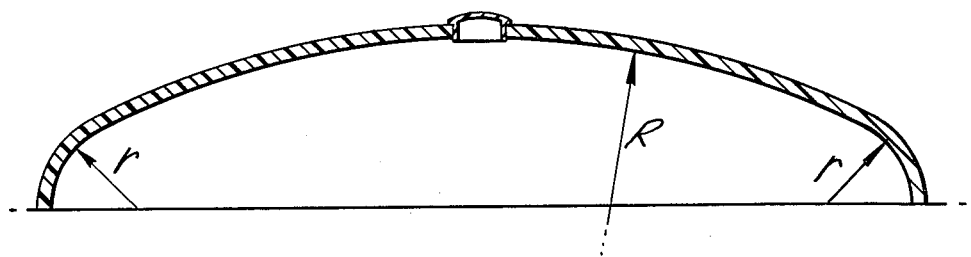
FIGS. 7A and 7B show the plan and section of an ellipsoidal dome.
Figure 7B:
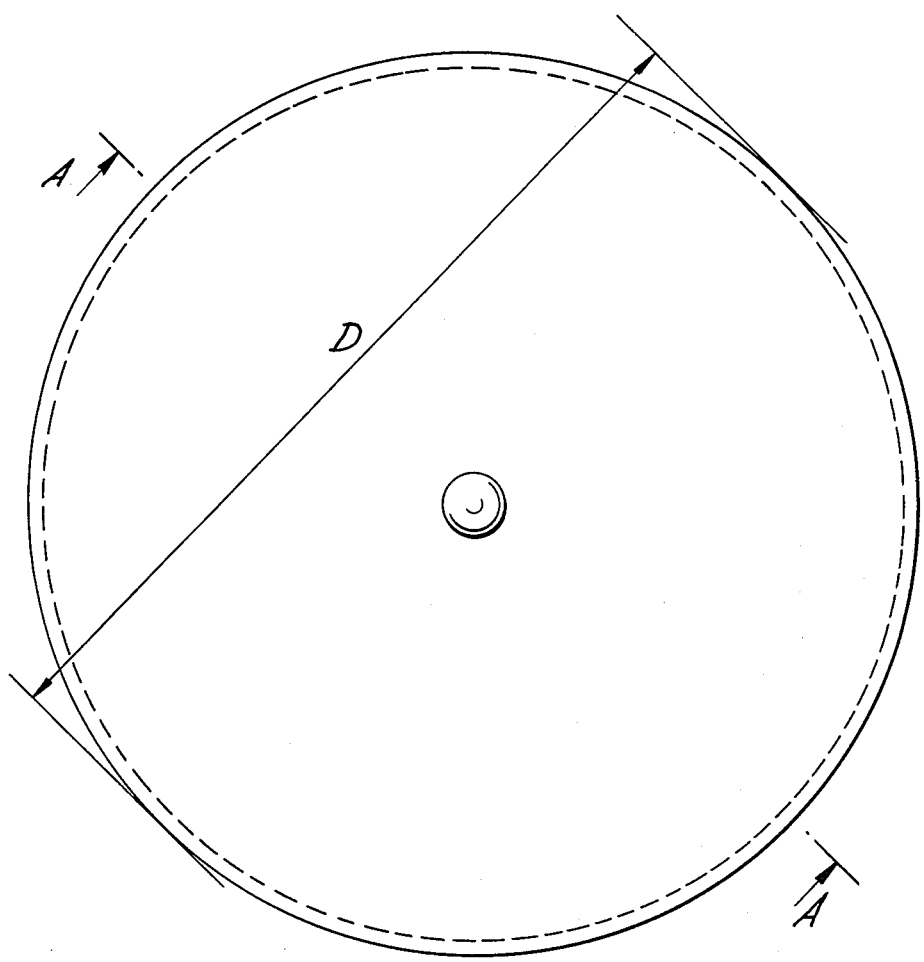

Referring to FIGS. 7, 13 and 15, the construction method is similar to that used in building hemispherical domes, but the equipment has been altered.

Figure 21A:
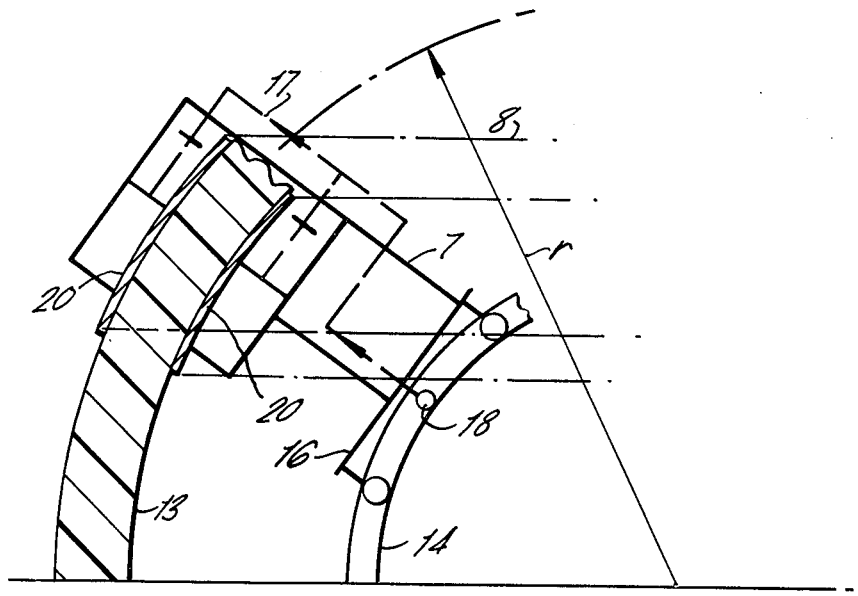
FIGS. 21A and 21B show the method of changing the vertical curvature of the shutter faces, when used to form ellipsoidal domes, as in FIGS. 14 and 15.
Figure 21B:
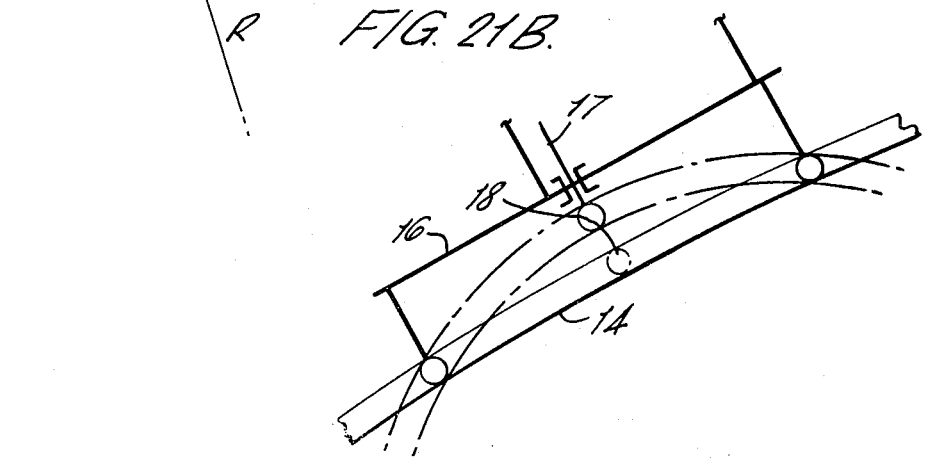
Figure 22A:
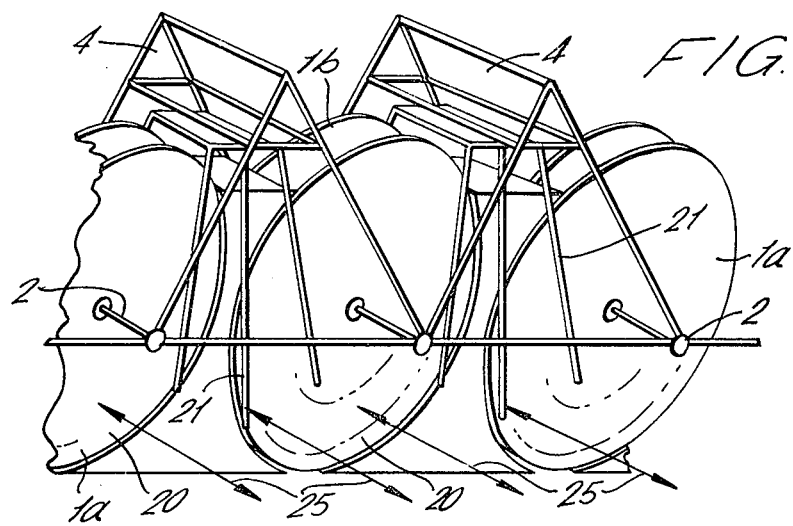
Figure 22C:
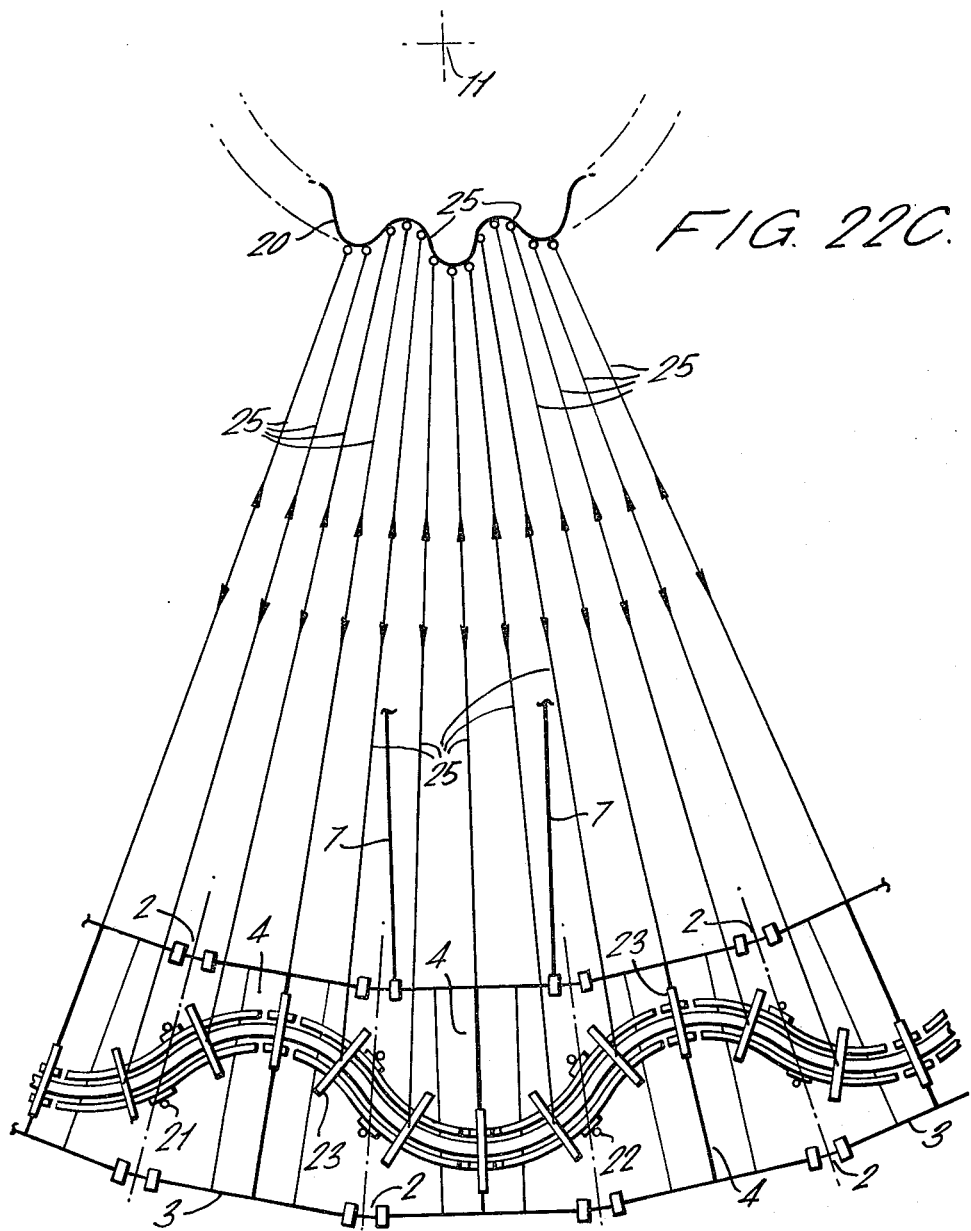

A twin tracked rail beam 14 is supported on a trolley at its free end 15, while the fixed end is capable of horizontal rotation about the central mast 11. A trolley 15 that supports the rail beam 14 is capable of describing a horizontal circular path about the central mast. A second trolley 16 is radially placed upon the rail beam, and can travel along the length of the rail beam 14. The second trolley 16 supports a short radius arm 7, that is capable of elongation, which in turn supports the slightly modified shutters 8. The elevation of the rail beam is similar to the final outline of the ellipsoidal dome, but the dimensions are reduced by the length of the radius arm. This type of dome has two radii, measured in the vertical plane, and the shutters are modified to accomodate the change of radius. FIG. 21 shows details of the modification, which consist of constructing each spherical segment and make up piece from an elastic material 20, by a system of sliding yokes 17 that are capable of moving radially in relation to the triangular link system, articulated arms and connections alter the vertical curvature of the shutter surface. Control of this change of curvature is made by fitting a jockey wheel 18 mid-way between the main pairs of wheels of the trolley 16 that run on the rail beam. The difference in rail curvature in a vertical plane 19 will operate the jockey wheel in relation to the trolley, and by a linkage, the movement of the jockey wheel operates the sliding yokes 17 that control the vertical curvature of the shutters. This change in curvature is completed automatically, as the trolley 16 travels the length of the radial rail beam 14.

Construction of the dome follows a procedure similar to that of a hemisphere, with the radial rail beam rotating about the central mast, and the trolley supporting the shutters gradually up and inwards along the rail beam, as the dome is constructed. As the trolley reaches the apex of the dome, the shutters are almost in their fully retracted state. On being full contracted, the short radius arm 7 is contracted, so that the shutter passes through the hole in the apex of the dome. The dome is completed by lowering the clear plastics cover on a telescopic mast so that the hole is closed.

Figure 8A:
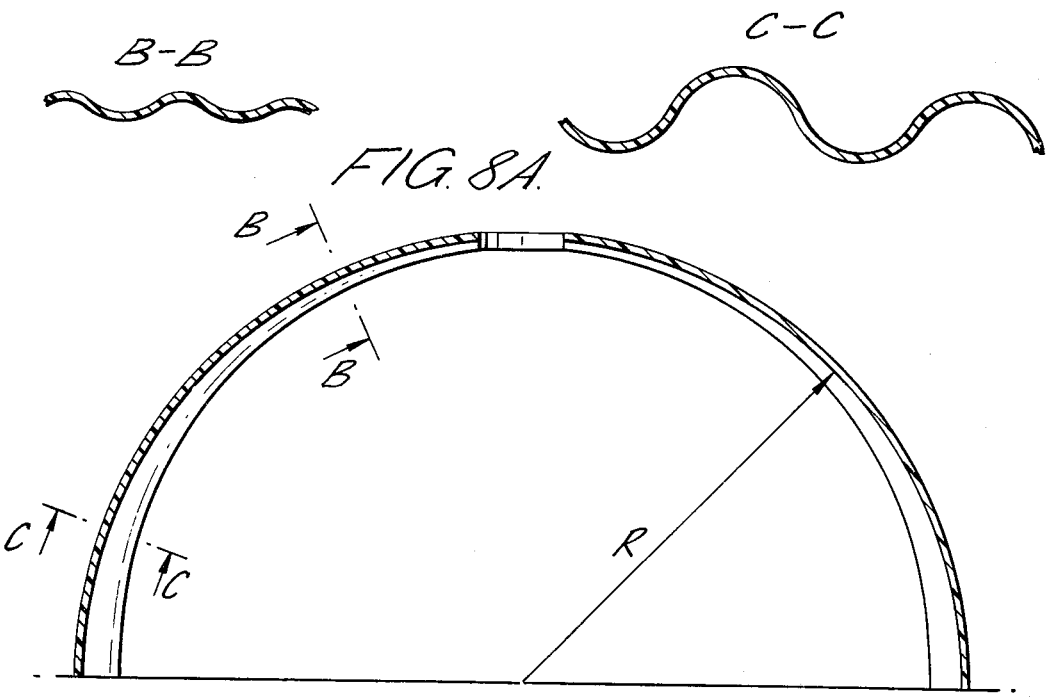
FIGS. 8A, 8B and 9A and 9B show details of fluted domes of hemispherical and ellipsoidal form.
Figure 8B:
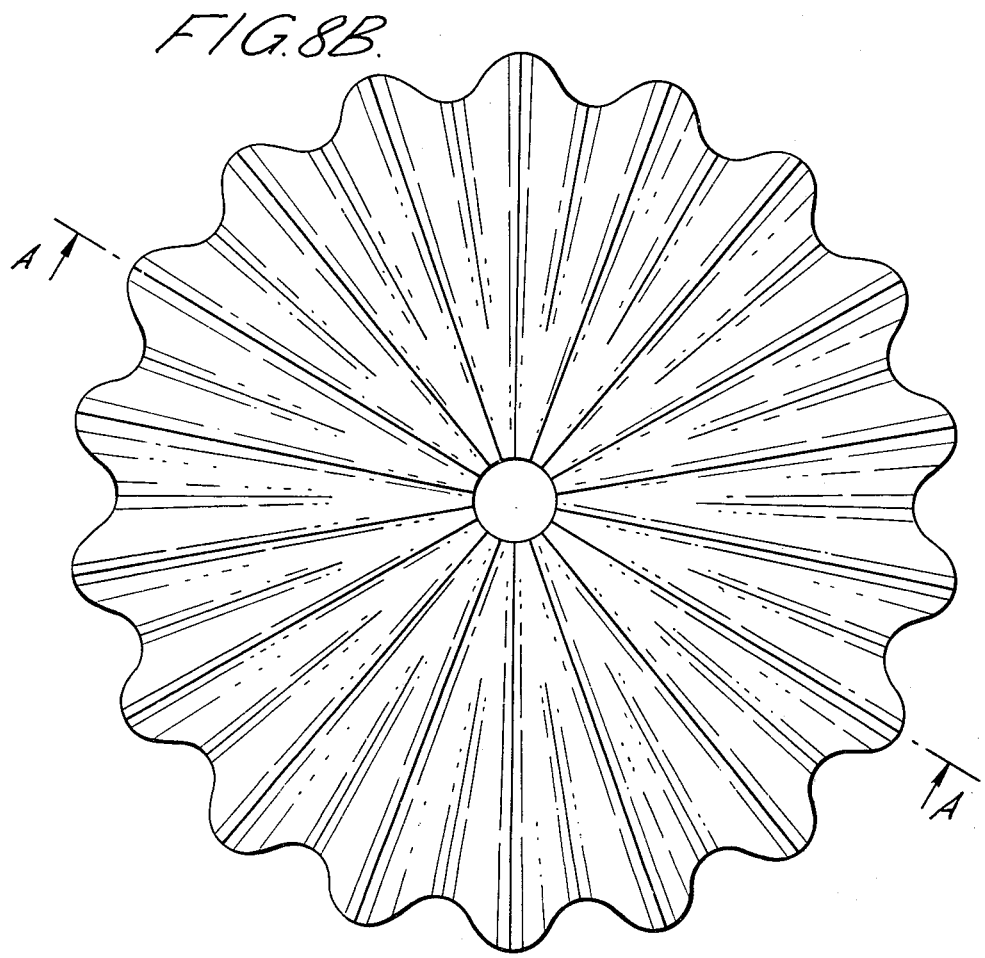
Figure 9A:
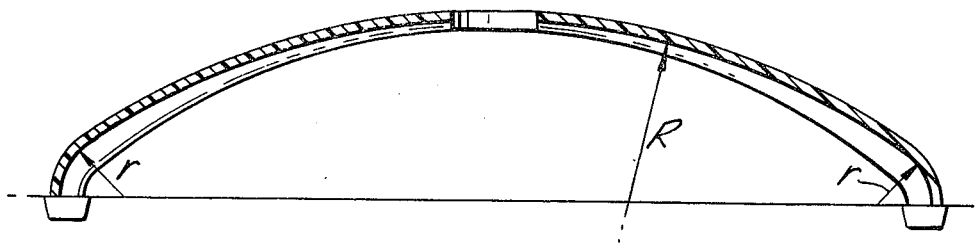
Figure 9B:
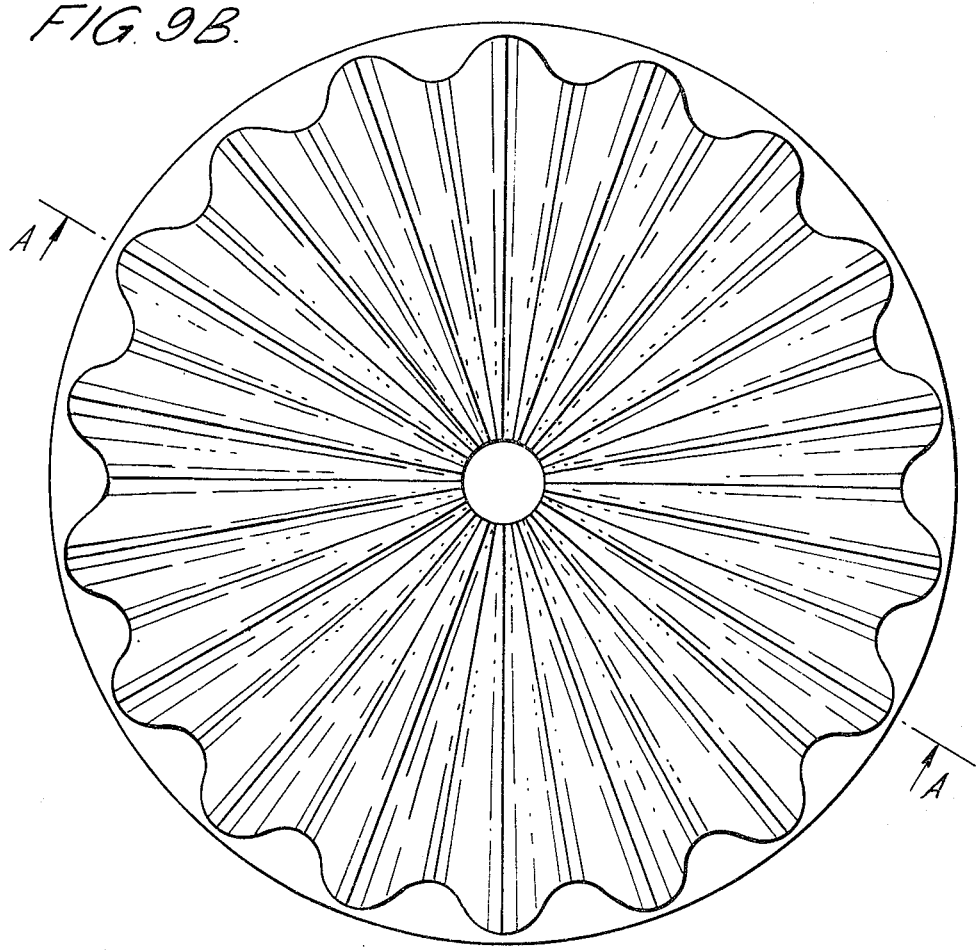
Figure 10A:
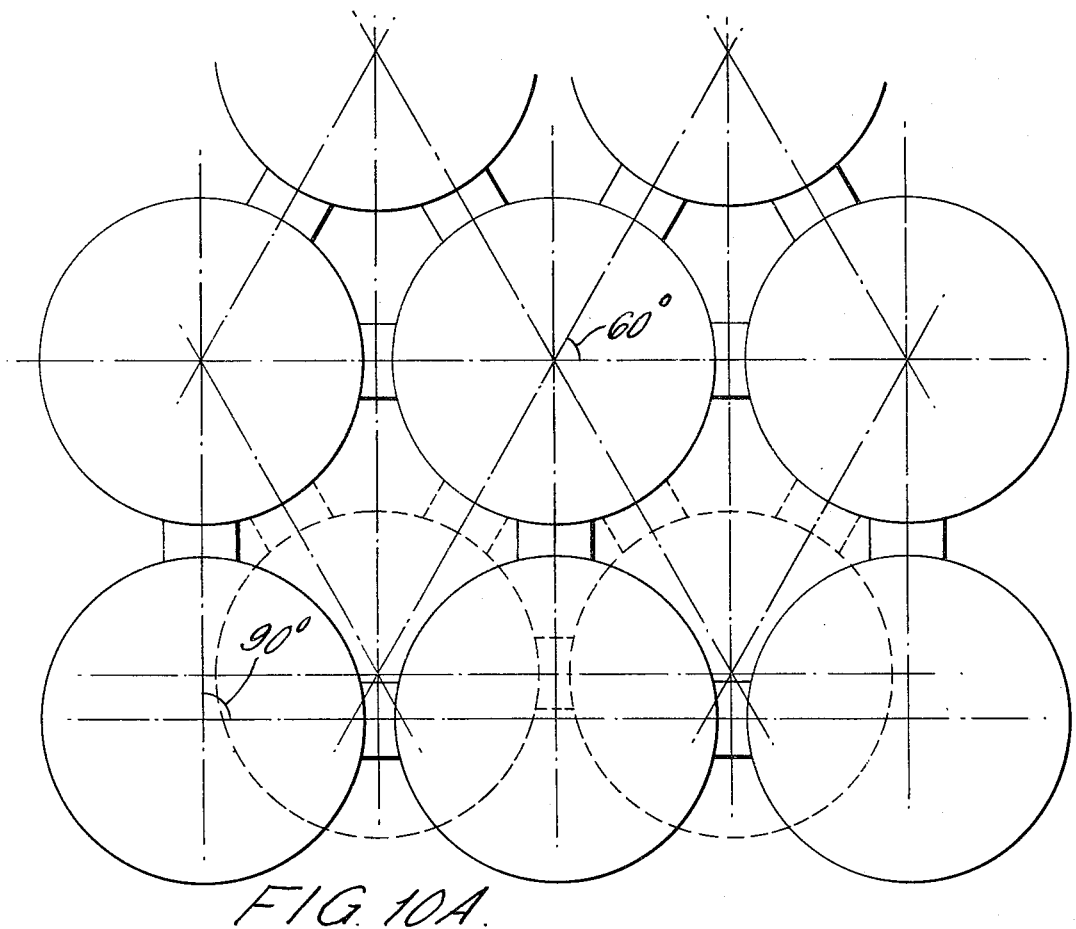
FIGS. 10A, 10B and 11A and 11B show the plan and sections of interconnecting and overlapping domes.
Figure 10B:
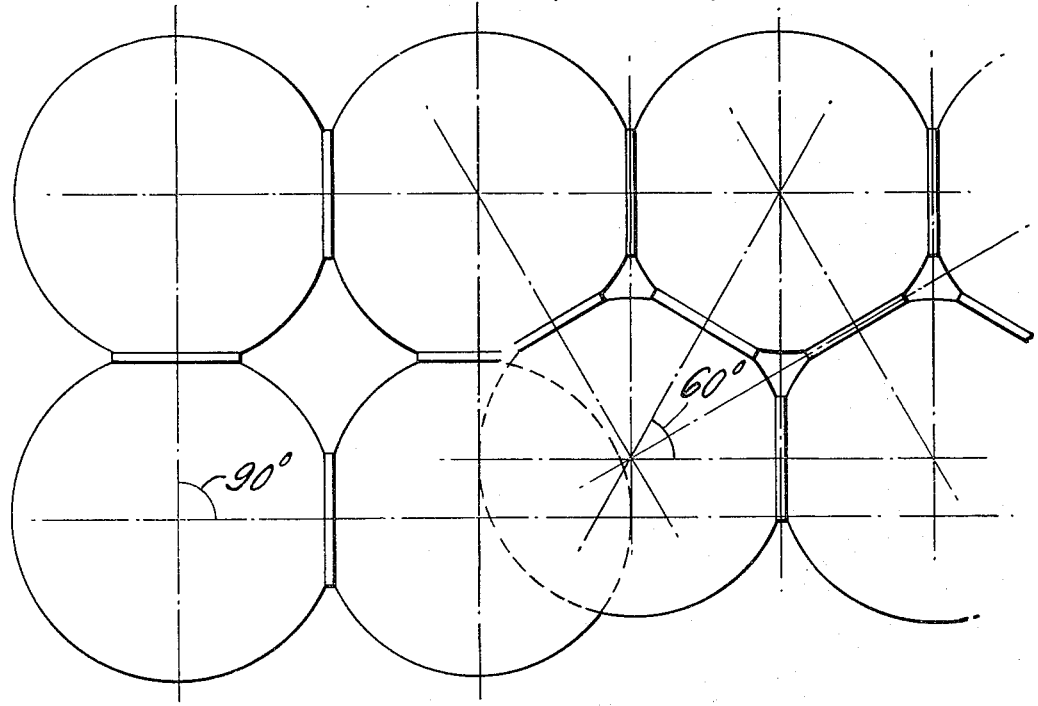
Figure 11A:
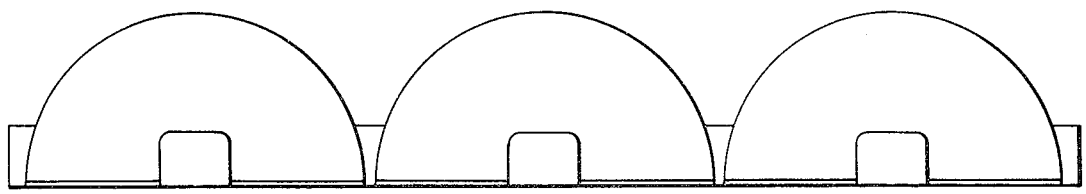
Figure 11B:
Figure 11C:
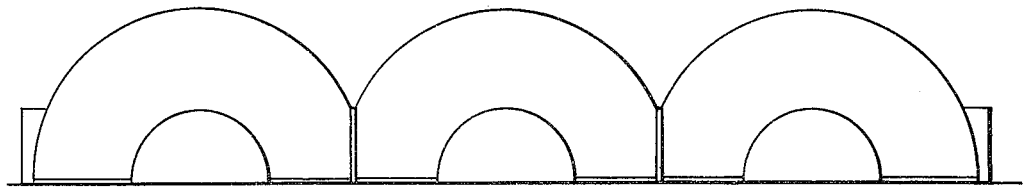
Figure 11D:

Referring to FIGS. 8, 9, and 22, the method of forming fluted structures is identical for both structure types.

A continuous cam surface 20 is fitted in a horizontal plane about the central mast 11. This cam controls and sets out the radial corrugations of the whole dome.

The shutter segments are all made from elastic material, and are held in position by yoked levers 21, that are connected by articulated joints 22 to the rear, or outside as seen in FIG. 22, faces of the shutters. The yokes are capable of sliding radially along the radial tie 4 that connects the two series of articularing triangular frames 3 together. The yokes are pivotly mounted at the centre of a respctive slider 23, the rotation being in a horizontal plane. Each yoke is directly connected by a system of push pull rods 24 to cam followers 25 that move round the central cam 20 located about the central mast 11.

As the radius arm or the rail beam is rotated about the central mast, the series of cam followers 25 actuate the yokes 21 that will cause the shutter segments and their make up 5, to follow a corresponding enlarged path of the central cam over the circumference of the dome at ground level.

As the first course of the corrugated wall is completed, the cam 20 is not used further, and the linkage 24 is made from free moving by the elevation of the radius arm above a horizontal plane. The continuation of the corrugations is maintained by the shutter faces following the shape of the preceding course. Due to articulation of the shutters, and deflection of the yokes 21, the wave length and amplitude of the corrugations will decrease uniformly towards the apex of the dome.

Referring to FIG. 23, the method of continuously lining each face of the shutters is shown. Two identical coils of material 26 in strip form are mounted on either side of the shutter structure 8, so that the strip can be paid out along the longitudinal line of the shutters. The width of the strip is greater than the maximum rise expected from the foam within the shutters.

As the shutter structure is rotated about the central mast 11, this movement operated two pairs of meshing spur gear wheels 27, each pair mounted adjacent to the coils of strip material. The depth of the spur gear wheels completely cover the full width of the strip material, as it passes through the meshing teeth. The crimped strip 29 is then passed forwards on the outside of each shutter towards the forward end. At the forward mouth 30 between the two shutter faces a further two sets of mating rolls 31 are located, one set to each shutter. The crimped strip 29 is returned round and between the mating rolls and pass to the rear of the shutter on both inside faces. The mating rolls 31 are shaped to give the correct vertical curve to the crimped strip, so that it conforms to the curvature of the shutter faces.

As the shutter is articulated, the strip is progressively elongated out of crimp on its outer edge of the curve 32. This curvature of the crimped strip will progressively increase as the shutters articulate, and is limited to the full extension of the crimp on the side of maximum radius 33.

The two sets of gear wheels 27 and mating rolls 31 are driven by the passage of the shutters over the ground or completed shell. These drives 34 can be used to seal the horizontal laps 35 between successive layers of facing material.

The building may be 40 feet in diameter with a wall 2 or 3 inches in thickness and may be constructed in 2 or 3 hours. The building could be used in agriculture, the construction industry, disaster zones, for military use or in exploration, such as in Antartica.

I claim as my invention:

1. Apparatus for constructing a domed building of polyurethane foam, comprising support means and movable nozzle means, said movable nozzle means having an exit means, means for moving said nozzle means at a controlled rate around said support means for forming said domed building, means for passing foam forming reactants into said nozzle means, and a pair of elongate shutter means movable continuously with said nozzle means in the direction of their length and comprising inwardly facing surfaces of double curvature which conforms with and defines the thickness of the domed wall of the building, said pair of shutters being capable of articulation by articulation means within the depth of the shutters in the length of the domed wall whereby when the foam forming reactants are passed into said nozzle means and the means for moving said nozzle means moves said nozzle means and shutter means at said controlled rate a stable foam forming a wall of said building is produced.

2. Apparatus as in claim 1, including means for continuously lining the internal faces of the shutters with aluminum foil, said foil being deformed and locally extended so as to conform to any changes in the double curvature of the shutter faces and also to be capable of following the linear articulation of the shutters.

3. Apparatus as in claim 1, each surface of said shutters being made up of a pin jointed chain of six interconnected convex and six concave spherical segments, the point of attachment of each segment to the chain being the apex, which also forms a hinge of the respective chain of shutters, each pair of chain links being rigidly connected at mid-span by a yoke that spans the wall section.

4. Apparatus as in claim 3, in which supports of each pair of inwardly facing spherical segments are co-axial and their common axis passes radially through the point of origin of the circular domed building.

5. Apparatus as in claim 3, in which the interconnecting yokes and the length of links between hinges are adjustable, whereby the thickness of the domed wall and also the curvature of the domed shell can be varied.

6. Apparatus as in claim 3, in which the spherical segments are made from flexible material and are capable of controlled deformation of curvature to conform to the local curvature of the shell of the dome.

7. Apparatus as in claim 3, in which said support means is adapted for maintaining the pair of shutters in circumferential orbit about the point of origin of the domed building, for permitting the shutters to follow a horizontal path about the vertical axis of the domed building and for withdrawing said nozzle means and shutter means from a completed dome wall through an apex area thereof.

8. Apparatus as in claim 7, in which a point of securement lies at the mid-point of the internal chain of links, of which there are five, and the adjacent links that support the opposing pairs of spherical segments are rotatable on their interconnecting links about their supporting hinge pins.

9. Apparatus as in claim 3, including means for supporting a closure segment for said building when completed above an open apex of the building while the building is being constructed, and means of lowering the closure segment over the open apex.

10. Apparatus as claimed in claim 9, in which said support means includes a rotatable central mast with a retractable top extension means, at the base of which a retractable radial arm is free to revolve circumferentially, the free end of which supports said shutters so that the axes of the hinges of the interconnecting links of the shutters continue to pass through the point of origin of the dome at all stages of shutter articulation.

11. Apparatus as in claim 10, in which the retractable radius arm is mounted on trolley means that is radially mounted on a twin-tracked rail beam that is shaped to the vertical curvature of the dome, and said rail beam is pivotally connected to said central mast at the apex, while the free end is circumferentially mounted on said trolley means, so that the rail surface that supports the shutters generates the shell of the building as the shutters describe a circular path about said central mast.

12. Apparatus as in claim 10, further including radial push-pull rods for allowing flexing of said segments to ride over the surface of a circular pathed corrugated cam located centrally about the foot of said mast, cam follower means being adapted to ride the surface of said cam whereby similar but larger corrugations are cast in the wall said flexible shutters following on each revolution the shape already formed by the preceding pass, so that tapered fluting is cast into the shell wall from ground-level and decreasing in wavelength and amplitude towards the apex.

* * * * *